(12) United States Patent
Kurani

(10) Patent No.: US 11,354,738 B1
(45) Date of Patent: *Jun. 7, 2022

(54) SYSTEMS AND METHODS FOR OPERATING A MATH-BASED CURRENCY EXCHANGE

(71) Applicant: Wells Fargo Bank, N.A., San Francisco, CA (US)

(72) Inventor: Ashish B. Kurani, Burlingame, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 64 days.

This patent is subject to a terminal disclaimer.

(21) Appl. No.: 16/712,695

(22) Filed: Dec. 12, 2019

Related U.S. Application Data

(63) Continuation of application No. 14/562,059, filed on Dec. 5, 2014, now Pat. No. 10,565,645, which is a continuation-in-part of application No. 14/282,200, filed on May 20, 2014, now Pat. No. 11,062,278, and a continuation-in-part of application No. 14/282,189, filed on May 20, 2014, now Pat. No. 10,970,684, and a continuation-in-part of application No. 14/282,202, filed on May 20, 2014, now Pat. No. 10,909,509.

(51) Int. Cl.
*G06Q 40/00* (2012.01)
*G06Q 40/04* (2012.01)

(52) U.S. Cl.
CPC ................... *G06Q 40/04* (2013.01)

(58) Field of Classification Search
CPC ....... G06Q 20/04; G06Q 20/10; G06Q 20/105
See application file for complete search history.

(56) References Cited

U.S. PATENT DOCUMENTS

| | | | |
|---|---|---|---|
| 5,920,629 A | | 7/1999 | Rosen |
| 6,029,146 A | * | 2/2000 | Hawkins ................ G06Q 40/00 235/379 |

(Continued)

FOREIGN PATENT DOCUMENTS

| | | |
|---|---|---|
| CA | 2975528 A1 | 12/2016 |
| WO | WO-2006/009716 A2 | 1/2006 |

OTHER PUBLICATIONS

Free Software Foundation (The GNU Privacy Handbook, Chapters. Key Management, http://web.archive.org/web/20060615000000*/https://www.gnupg.org/gph/en/manual/x457.html, Jun. 18, 2006) (Year: 2006).*

(Continued)

*Primary Examiner* — Mike Anderson
*Assistant Examiner* — Mark H Gaw
(74) *Attorney, Agent, or Firm* — Foley & Lardner LLP

(57) ABSTRACT

A method of performing a currency trade involving a math-based currency ("MBC") for a customer having a MBC account with a financial institution is described. The financial institution receives a trade order and determines an optimal trade sequence that may involve more than one trade to achieve the initially requested currency trade. The financial institution updates account balances associated with the customer on an overlay ledger to reflect the currency trade. The overlay ledger includes information relating to account balances of a plurality of MBC accounts associated with a plurality of customers.

17 Claims, 11 Drawing Sheets

(56) References Cited

U.S. PATENT DOCUMENTS

| | | | |
|---|---|---|---|
| 6,047,067 A | 4/2000 | Rosen | |
| 6,721,715 B2* | 4/2004 | Nemzow | G06Q 40/00 705/35 |
| 7,103,575 B1 | 9/2006 | Linehan | |
| 8,086,507 B1 | 12/2011 | Alder | |
| 8,381,969 B1 | 2/2013 | Miller et al. | |
| 8,417,629 B1 | 4/2013 | Hildebrand et al. | |
| 9,022,286 B2 | 5/2015 | Wyatt | |
| RE46,319 E | 2/2017 | Milman et al. | |
| 2002/0138735 A1 | 9/2002 | Felt et al. | |
| 2002/0156718 A1* | 10/2002 | Olsen | G06Q 40/00 705/37 |
| 2003/0028481 A1 | 2/2003 | Flitcroft et al. | |
| 2004/0143523 A1 | 7/2004 | Pegaz-Paquet et al. | |
| 2004/0177035 A1 | 9/2004 | Silva | |
| 2005/0228986 A1 | 10/2005 | Fukasawa et al. | |
| 2007/0130463 A1 | 6/2007 | Law et al. | |
| 2007/0136209 A1 | 6/2007 | Khan et al. | |
| 2007/0168282 A1 | 7/2007 | Giordano | |
| 2008/0082439 A1* | 4/2008 | Everaert | G06Q 40/04 705/37 |
| 2008/0120248 A1* | 5/2008 | Roehr | G06Q 40/06 705/36 R |
| 2008/0223918 A1 | 9/2008 | Williams et al. | |
| 2008/0270285 A1* | 10/2008 | Cartledge | G06Q 40/04 705/37 |
| 2009/0037913 A1 | 2/2009 | Dantzig et al. | |
| 2010/0057607 A1* | 3/2010 | Galit | G06Q 20/04 705/37 |
| 2012/0101886 A1 | 4/2012 | Subramanian et al. | |
| 2012/0259716 A1 | 10/2012 | Rosenberger | |
| 2013/0124306 A1 | 5/2013 | Hutchinson et al. | |
| 2013/0166455 A1* | 6/2013 | Feigelson | G06Q 30/06 705/64 |
| 2014/0006273 A1 | 1/2014 | Gopinath et al. | |
| 2014/0032394 A1 | 1/2014 | Liberty et al. | |
| 2015/0120569 A1 | 4/2015 | Belshe et al. | |
| 2015/0310476 A1 | 10/2015 | Gadwa | |
| 2015/0324764 A1 | 11/2015 | Van Rooyen et al. | |
| 2015/0332256 A1 | 11/2015 | Minor | |
| 2016/0098723 A1 | 4/2016 | Feeney | |
| 2016/0203572 A1 | 7/2016 | McConaghy et al. | |
| 2016/0234026 A1 | 8/2016 | Wilkins et al. | |
| 2016/0300234 A1 | 10/2016 | Moss-Pultz et al. | |
| 2016/0323109 A1 | 11/2016 | McCoy et al. | |
| 2016/0330031 A1 | 11/2016 | Drego et al. | |
| 2016/0350728 A1 | 12/2016 | Melika et al. | |
| 2016/0350749 A1 | 12/2016 | Wilkins et al. | |
| 2017/0078255 A1 | 3/2017 | Nejadian et al. | |
| 2017/0187535 A1 | 6/2017 | Middleton et al. | |
| 2017/0236104 A1 | 8/2017 | Biton | |

OTHER PUBLICATIONS

Bower, B. (Aug. 8, 2019). How an ancient stone money system works like cryptocurrency. Retrieved Jul. 27, 2020, from https://www.sciencenews.org/article/yap-stone-money-bitcoin-blockchain-cryptocurrency (Year: 2019).

Fitzpatrick et al., "Banking on Stone Money: Ancient Antecedents to Bitcoin", Jun. 2019, American Anthropological Association, Economic Anthropology Jun. 2019, p. 1-4, 8-10 (Year: 2019).

Pandya, D., Ram K. Thakkar, S., Madhekar. T., & Thakare, B. (2015). Brief History of Encryption, International Journal of Computer Applications, 131 (9), 28-31. Doi: 10.5120/ijca2015907390 (Year: 2015).

Peters et al., Understanding Modem Banking Ledgers through Blockchain Technologies: Future of Transaction Processing and Smart Contracts on the Internet of Money, Nov. 19, 2015, pp. 1-33.

"Adding Metadata to the Blockchain, part 1," Digiconomist, retrieved from https://digiconomist.net/adding-metadata-blockchain-part-1, 5 pages (2015).

"Capital adequacy ratios for banks—simplified explanation and example of calculation," Reserve Bank of New Zealand, 9 pages (2007).

"Metadata in the Blockchain: The OP_RETURN Explosion," Coin Sciences Ltd, retrieved from https://www.slideshare.net/coinspark/bitcoin-2-and-opreturns-the-blockchain-as-tcpip, 31 pages (2014).

"What are Coloured Coins and Meta Coins?," CryptoCompare, retrieved from https://www.cryptocompare.com/coins/guides/what-are-coloured-coins-and-meta-coins/, 6 pages (2015).

Bitcoin Directory, Bitcoin Exchange Directory, as available online on Aug. 13, 2011 at http://www.bitcoindir.com/exchange, retrieved from the Internet archives on Oct. 9, 2015, 1 page as printed.

Free Software Foundation(The GNU Privacy Handbook, Chapter 3, Key Management. http://web.archive.org/web/20060615000000*/https://www.gnupg.org/gph/en/manual/z457.html, Jun. 18, 2006). 1 page.

Mizrahi, "A blockchain-based property ownership recording system," ChromaWay, retrieved from https://chromaway.com/papers/A-blockchain-based-property-registry.pdf, 9 pages (2014).

Nakamoto, "Bitcoin: A Peer-to-Peer Electronic Cash System," Bitcoin, retrieved from https://bitcoin.org/bitcoin.pdf, 9 pages (2008).

Office Action on U.S. Appl. No. 14/562,059, dated Nov. 5, 2015, 39 pages.

The Free Software Foundation, The GNU Privacy Handbook, Chapters, Key Management, http://web.archive.org/web/20060615000000*/https://www.gnupg.org/gph/en/manual/x457.html, Jun. 18, 2006, 1 page.

Webopedia, Public Key Encryption definition, as available on Mar. 18, 2008 at http://www.webopedia.com/TERM/P/public_key_cryptograph.html, retrieved from the Internet archives on Oct. 9, 2015, 3 pages as printed.

* cited by examiner

106

Financial Institution Computing System

128

Overlay Ledger

Deposit Accounts 302

| Account # | Customer | MBC Balance |
|---|---|---|
| 123456781 | AAAAAA | 23.5643 |
| 123456782 | AAAAAB | 1.2456 |
| 123456783 | AAAAAC | 100.1762 |
| 123456784 | AAAAAD | 11.2654 |
| 123456785 | AAAAAE | 0.0056 |
|  |  |  |
|  | Total: | DDD |

306

Credit Accounts 306

| Account # | Customer | MBC Balance |
|---|---|---|
| 223456781 | BAAAAA | 2.3454 |
| 223456782 | BAAAAB | 12.0364 |
| 223456783 | BAAAAC | 13.2765 |
| 223456784 | BAAAAD | 53.0043 |
| 223456785 | BAAAAE | 0.9821 |
|  |  |  |
|  | Total: | CCC |

306

126

Pooled Account: Key Storage

| Private Key | Public Key | Hash | Amount |
|---|---|---|---|
| PrKp234561 | PuKp234561 | Hash234561 | 23.2445 |
| PrKp234562 | PuKp234562 | Hash234562 | 1.5606 |
| PrKp234563 | PuKp234563 | Hash234563 | 67.2345 |
| PrKp234564 | PrKp234564 | Hash234564 | 5.0934 |
| PrKp234565 | PrKp234565 | Hash234565 | 4.2341 |
|  |  |  |  |
|  |  | Total: | XXX |
|  | where XXX << CCC; XXX << DDD |  |  |

FIG. 3

SYSTEMS AND METHODS FOR OPERATING A MATH-BASED CURRENCY EXCHANGE

CROSS-REFERENCE TO RELATED APPLICATIONS

This application is a continuation of U.S. patent application Ser. No. 14/562,059, titled "SYSTEMS AND METHODS FOR OPERATING A MATH-BASED CURRENCY EXCHANGE," filed on Dec. 5, 2014, which is a continuation-in-part of U.S. patent application Ser. No. 14/282,189, titled "SYSTEMS AND METHODS FOR MAINTAINING DEPOSITS OF MATH-BASED CURRENCY," filed on May 20, 2014, which is a continuation-in-part of U.S. patent application Ser. No. 14/282,200, titled "SYSTEMS AND/ METHODS FOR MATH-BASED CURRENCY CREDIT TRANSACTIONS," filed on May 20, 2014, which is a continuation-in-part of U.S. patent application Ser. No. 14/282,202, titled, "INFRASTRUCTURE FOR MAINTAINING MATH-BASED CURRENCY ACCOUNTS," filed on May 20, 2014. Each of the above referenced applications are herein incorporated by reference in their entireties and for all purposes. U.S. patent application Ser. No. 14/562,059 is related to U.S. patent application Ser. No. 14/562,043, titled "SYSTEMS AND METHODS FOR IDENTITY VERIFICATION OF MATH-BASED CURRENCY ACCOUNT HOLDERS," which is herein incorporated by reference in its entirety and for all purposes.

BACKGROUND

Math-based currency ("MBC"), commonly referred to as cryptocurrency, is rising in popularity, use, and public acceptance. MBC differs from fiat currency (i.e., currency that is declared by a government to be a legal tender) in that principles of cryptography are used to create, secure, and transfer MBC directly from a first user to a second user. A user of MBC can transfer funds to another party by using a private key associated with a certain value of MBC. The private key may be used to generate a signature for the transaction, and the signature can be verified by nodes in the MBC network, thereby completing the transaction. Additional information, including the identities of the parties involved in the exchange, is not required to effectuate the transaction. Accordingly, MBC allows for anonymous transfers of currency between users without the reliance on financial institutions (e.g., a bank) to facilitate the transfer. Examples of MBCs include Bitcoin, Ripple, Litecoin, Peercoin, and Dogecoin, among others.

Generally, users of MBC store information relating to private key and public key pairs that are associated with specific values of MBC in MBC wallet applications. The wallet applications are used to facilitate the above described transfers. Services that provide a secure place for users to store private keys associated with MBC. Beyond that, however the wallet applications do not take actual possession of or an ownership interest in the MBC.

SUMMARY

A first exemplary embodiment relates to a method of performing a currency trade involving a MBC for a customer having a MBC account with a financial institution. The method includes receiving, at a processor of a financial institution computing system, a trade order from the customer via a customer computing device. The trade order includes a request from the customer to trade a first amount of a first currency for a second amount of a second currency, wherein one of the first currency and the second currency is the MBC. The method further includes determining, by the processor, current exchange rates for a plurality of different currency transactions including the exchange rate for the first currency to the second currency. The method includes determining, by the processor, an optimal trade sequence. The method further includes transmitting, by the processor, a currency trade request to a computing system associated with a trading partner. The method includes receiving, by the processor, a trade confirmation from the computing system associated with the trading partner. The method further includes updating, by the processor, an account balance associated with the customer on an overlay ledger to reflect the currency trade, wherein the overlay ledger includes information relating to account balances of a plurality of MBC accounts associated with a plurality of customers.

Another exemplary embodiment relates to a banking system of a financial institution for opening and maintaining deposit accounts of MBC. The system includes a network interface configured to facilitate data transmission over a network. The system further includes an overlay ledger including information relating to a plurality of MBC accounts associated with a plurality of customers. The system includes a database of private key and public key pairs associated with various amounts of MBC held by the banking system. The system further includes at least one processor configured to receive a trade order from the customer via a customer computing device. The trade order includes a request from the customer to trade a first amount of a first currency for a second amount of a second currency, wherein one of the first currency and the second currency is the MBC. The processor is further configured to determine current exchange rates for a plurality of different currency transactions including the exchange rate for the first currency to the second currency. The processor is configured to determine an optimal trade sequence and to transmit a currency trade request to a computing system associated with a trading partner. The processor is further configured to receive a trade confirmation from the computing system associated with the trading partner. The processor is configured to update an account balance associated with the customer on the overlay ledger to reflect the currency trade.

A further exemplary embodiment relates to a non-transitory computer-readable media having stored therein a set of instructions that, when executed by a processor of a financial institution computing system, cause the financial institution computing system to implement a process of trading currency types. The process includes receiving a trade order from the customer via a customer computing device. The trade order includes a request from the customer to trade a first amount of a first currency for a second amount of a second currency, wherein one of the first currency and the second currency is the MBC. The process further includes determining current exchange rates for a plurality of different currency transactions including the exchange rate for the first currency to the second currency. The process includes determining an optimal trade sequence. The process further includes transmitting a currency trade request to a computing system associated with a trading partner. The process includes receiving a trade confirmation from the computing system associated with the trading partner. The process further includes updating an account balance associated with the customer on an overlay ledger to reflect the currency trade, wherein the overlay ledger includes information relating to account balances of a plurality of MBC accounts associated with a plurality of customers.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIG. 3 is a detailed representation of an overlay ledger and a pooled account within the financial institution computing system is shown according to an example embodiment.

DETAILED DESCRIPTION

Referring generally to the figures, banking systems and methods for math-based currency ("MBC") are shown. The banking systems and methods allow holders of MBC units to utilize advantageous banking services, such as deposit services, interest accrual, credit services, withdrawal services, insurance services, and the like. Additionally, the banking systems and methods allow financial institutions to take possession of MBC such that the financial institutions can insure deposits (i.e., up to FDIC limits) and lend against MBC deposits.

Figure 1:
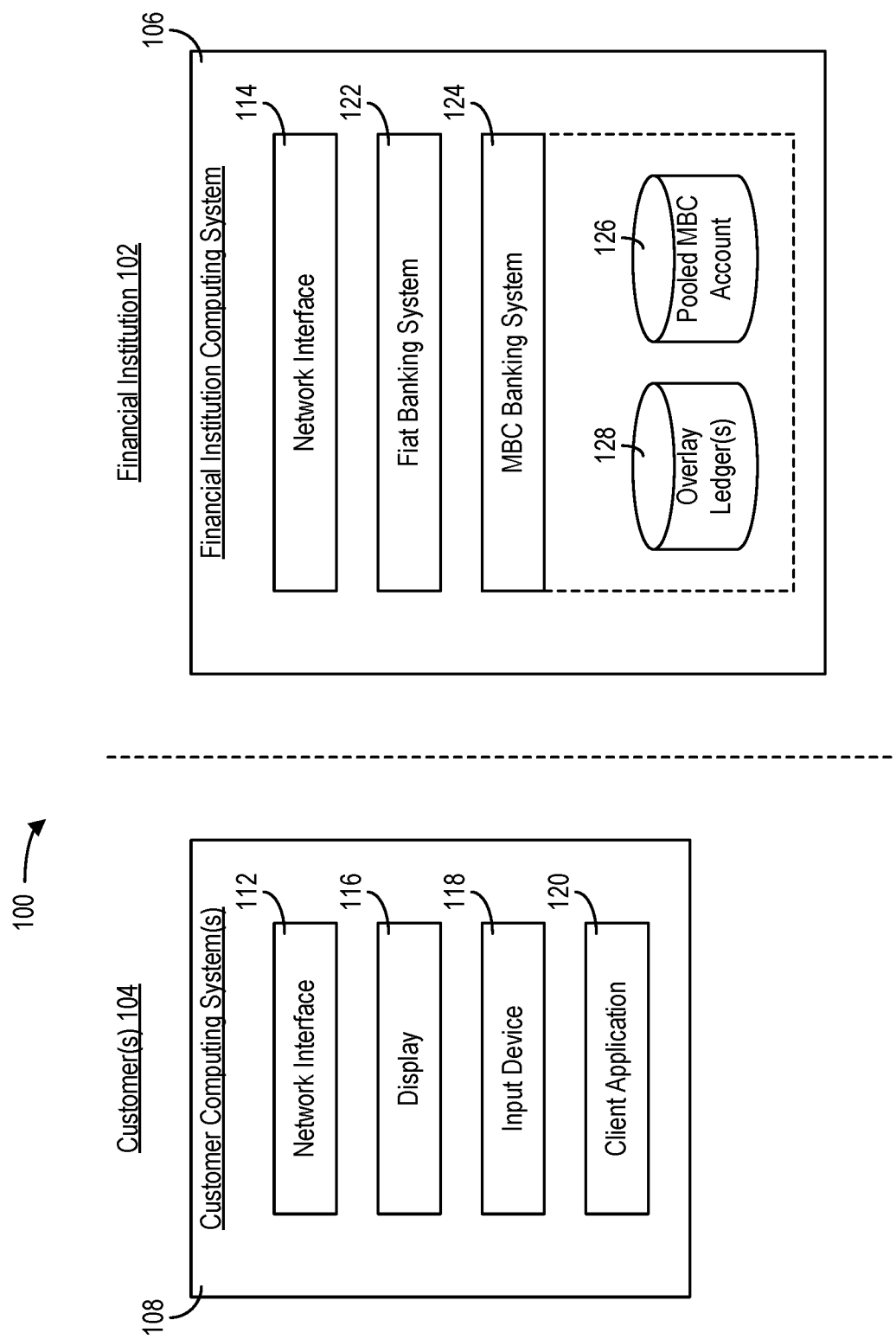
FIG. 1 is a schematic diagram of a banking system for math-based currency ("MBC") according to an example embodiment.

Referring to FIG. 1, a schematic diagram of a banking system 100 for MBC is shown according to an example embodiment. System 100 includes a financial institution 102 and a plurality of banking customers 104. Generally, customers 104 interface with the financial institution 102 by communicating with the financial institution computing system 106 via customer computing systems 108. The customer computing systems 108 may include smartphones, tablet computing systems, laptop computing systems, desktop computing systems, PDAs, and the like. The financial institution computing system 106 may, for example, include one or more servers each with one or more processors configured to execute instructions stored in a memory, send and receive data stored in the memory, and perform other operations to implement the financial services described herein associated with the processing modules, databases, and processes shown in FIGS. 1-10. Customer computing systems 108 and financial institution computing system 106 communicate over a network. The network may include one or more of the Internet, cellular networks, proprietary banking networks, and the like. Customer computing systems 108 each include a network interface 112 to facilitate data transmission over the network 128. Likewise, the financial institution computing system 106 includes a network interface 114 to facilitate data transmission over the network.

Customer computing systems 108 each include a display 116, an input device 118, and a client application 120. The display 116 may be used to present account information, transaction information, and the like to customers 104. The input device 118 may be used to provide input to the customer computing systems 108 and to the financial institution computing system 106 through the network. The input may relate to deposit requests, withdrawal requests, credit requests, personal information, and other information used to facilitate transactions between the financial institution 102 and the customers 104. The input device may include a keyboard, a mouse, a touchscreen, a biometric sensor (e.g., a fingerprint sensor), a microphone, a camera, and so on. The client application 120 may comprise program logic (i.e., stored executable instructions) configured to implement at least some of the functions described herein. The client application 120 may simply be a web browser (e.g., Internet Explorer®, Chrome®, Safari®, etc.) configured to receive and display web pages received from the financial institution computing system 106. In other arrangements, the client application 120 may include a dedicated application (e.g., a smartphone application), a text message interface, or another program suitable for communicating with the financial institution computing system 106 over the network.

Financial institution 102 offers banking services to customers 104. Financial institution 102 offers traditional fiat currency banking services through a fiat banking system 122 within the financial institution computing system 106. Fiat currency is money that is declared by a government to be legal tender (e.g., US Dollars, Canadian Dollars, Chinese Yuan, Euros, Japanese Yen, etc.). The fiat banking services may include demand deposit accounts, credit services, loan services, investment services, and the like. As described in further detail below, financial institution 102 also offers MBC services through a MBC banking system 124 within the financial institution computing system 106.

In some arrangements, customers 104 are account holders with the financial institution 102. Customers 104 may use financial institution 102 for fiat banking services. For example, a customer 104 may have a fiat currency deposit account, such as a savings account or a checking account in US Dollars. Additionally or alternatively, customers 104 may have MBC accounts with the financial institution 102. In other arrangements, customers 104 are not account holders with the financial institution 102. In such arrangements, the customers 104 may be required to become account holders with the financial institution 102 prior to engaging in financial transactions with the financial institution 102. In order to become an account holder, the customer 104 may provide personal information (e.g., name, address, date of birth, social security number, tax identifications, etc.) to the financial institution 102 and submit to any necessary background checks.

As briefly mentioned above and as described in further detail with respect to FIGS. 2-10, the financial institution 102 provides MBC banking services to customers 104. In an example embodiment, MBC is electronically transferred from customers 104 to the financial institution 102 and the MBC is properly secured within the financial institution in order to avoid double spending of the MBC by the customer. In one example embodiment, the customer transfers various information for the MBC (including the private keys) and the financial institution 102 executes an internal transfer of the MBC to a new private key/public key pair which are then stored in a database. In another example embodiment, the customers 204 initiate a transaction to the financial institution 102 and the new private/public key pair which are created as a result of the performance of the transaction are stored in the database. The financial institution 102 includes a pooled MBC account 126 (i.e., a database of private key/public key pairs). The MBC stored in the pooled MBC account may be significantly less than the total amount of MBC received in the form of deposits and may not be associated with any particular customer. The financial institution computing system further includes at least one overlay ledger 128 that tracks the amount of MBC that is associated with each of the customers 104. Thus, the financial institution 102 does not need to separate each of the customers' 104 MBC into separate addresses or maintain a complete balance of MBC in the pooled MBC account 126.

The pooled MBC account 126 is used by the financial instruction 102 to take possession of MBC deposited by customers 104. The pooled MBC account 126 is a database of addresses, private keys, and public keys associated with MBC that has been transferred to the financial institution 102. The financial institution 102 maintains the contents of the pooled MBC account 126 in secrecy such that entities and people outside of the financial institution 102 do not have knowledge of the addresses, private keys, and public keys associated with the MBC transferred to the financial institution 102. Through the pooled MBC account 126, the financial institution 102 maintains the MBC from customers 104 received during deposit transactions and initiates transfers of MBC to customers 104 during withdrawal transactions. In some arrangements, the financial institution 102 may maintain a plurality of pooled MBC accounts (i.e., a plurality of separate databases) containing MBC of a plurality of customers. The plurality of pooled MBC accounts may be limited to pooling up to a certain number of customers 104 MBC, a certain amount of MBC, and/or may be divided by types of accounts (e.g., credit account, savings account, checking account, etc.). In further arrangements, the financial institution 102 maintains individual MBC accounts for each customer 104.

The overlay ledger 128 provides a record of association for the MBC within the pooled MBC account 126. The overlay ledger 128 associates an individual customer 104 with a designated amount of MBC transferred to the financial institution 102. The overlay ledger 128 may be stored in a database. Each account for customers 104 may be associated with a single entry in the database. The same or additional ledgering systems may be used to track transactions (e.g., credit and debit transactions) for each the specific MBC accounts. The financial institution 102 updates the overlay ledger 128 after each MBC transfer into and out of the pooled MBC account 126. In certain situations, the financial institution 102 may update the overlay ledger 128 without a transfer of MBC into or out of the pooled MBC account 126. For example, if a first customer wants to transfer a designated amount of MBC to a second customer, and both customers are account holders with the financial institution 102, the transfer may be effectuated by updating the overlay ledger 128 without an actual transfer of MBC in the pooled MBC account 126. Further details of how the financial institution 102 uses the overlay ledger 128 to maintain records of account balances and transactions are described below with respect to FIGS. 2-10.

Figure 2:
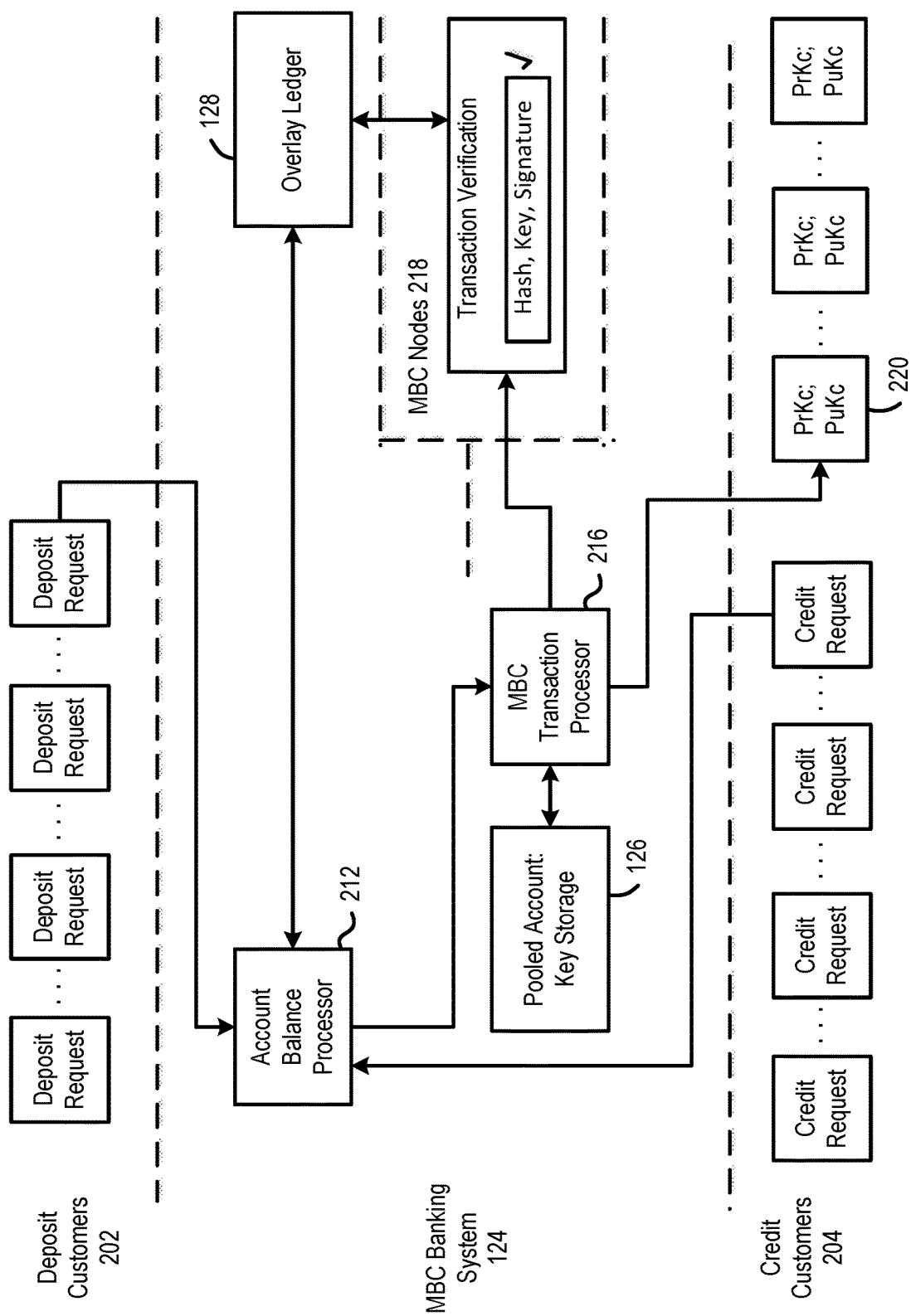
FIG. 2 is a flow diagram of interactions between customers and a MBC banking system according to an example embodiment.

Referring to FIG. 2, a flow diagram of interactions between deposit customers 202, credit customers 204, and a MBC banking system 124 (e.g., financial institution 102) is shown according to an example embodiment. Deposit customers 202 and credit customers 204 are account holders with the MBC banking 124. In other arrangements, and as described in further detail below, deposit customers 202 and credit customers 204 may be registered to become account holders with the MBC banking system 124 prior to engaging in transactions with the MBC banking system 124. As shown in FIG. 2, a flow of deposit requests 208 is received by the MBC banking system 124 from customers 202 and a flow of credit requests is received by the MBC banking system from customers 204. The deposits received from customers 202 are used to fund the credit given to customers 204. As will be appreciated, the customers 202 and 204 may be overlapping (i.e., a customer that makes a deposit in one situation may receive credit in another situation).

All customer requests (i.e., deposit requests 208 and credit requests 210) are received at an account balance processor 212 of the MBC banking system 124. The account balance processor 212 may communicate directly with client devices (e.g., customer computing systems 108) via a network (e.g., network 110). The account balance processor 212 receives requests (e.g., deposit requests 208 and credit requests 210), MBC information (e.g., public key information, private key information, hash value, signature information, etc.), deposit information (e.g., amount of MBC to be deposited), account information, and the like from deposit customers 202 and credit customers 204. Based on the received information, the account balance processor 212 updates data in the overlay ledger 128. The contents of the overlay ledger 128 are described in further detail below with respect to FIG. 3. The account balance processor 212 communicates the other received information with a MBC transaction processor 216.

The MBC transaction processor 216 processes transactions between the customers and the MBC banking system 124. As discussed above, in an example embodiment, the MBC banking system 124 secures the deposited MBC by transferring the MBC to a private key/public key pair owned by the MBC banking system 124. The MBC transaction processor 216 initiates these transactions. The transaction may take the form of a direct transaction from the customer to a private key/public key pair having information stored in the pooled account database 126 of the MBC banking system 124. In another embodiment, the transaction may involve a transfer of the private key/public key pair into the pooled account 126. In either case, the final information relating to the deposited MBC (e.g., the private key, the public key, the hash value, MBC balances, and any associated signatures or hashes) is stored in pooled account 126. As explained in further detail below with respect to FIG. 3, the pooled account 126 includes a database that stores the above noted information.

The MBC transaction processor 216 communicates MBC transaction information to MBC nodes 218. The MBC nodes 218 verify MBC transactions. The MBC nodes 218 may verify transactions involving the MBC bank 206 in addition to MBC transactions not involving the MBC bank 206. The MBC nodes 218 verify MBC transactions by verifying information relating to the transaction, such as by verifying the signatures of the MBC transactions and by verifying that there has not been double-spending of the MBC involved in the transaction. The information in the overlay ledger 128 may be updated to indicate that the transaction has been verified.

Still referring to FIG. 2, the MBC transaction processor 216 also communicates with credit customers 204. The MBC transaction processor 216 may communicate with credit customers 204 via computing devices of the credit customers 204 (e.g., via customer computing system 108). During a transfer of MBC from the MBC banking system 124 to credit customers 204, the MBC banking system 124 provides various information relating to the MBC 220, such as a private key for credit transactions ("PrKc"), a public key for credit transactions ("PuKc"), an amount of the MBC, and so on to the credit customers 204.

Referring now to FIG. 3, a detailed representation of the overlay ledger 128 and the pooled account 126 within the financial institution computing system 106 is shown. The overlay ledger 128 is a database that associates designated amounts of MBC with bank account numbers and customer identifications. The overlay ledger 128 may be split into multiple ledgers. For example, as shown in FIG. 3, the overlay ledger includes a listing of deposit accounts 302 and a listing of credit accounts 304. As will be appreciated, the overlay ledger may further be organized according to various types of accounts and subaccounts. Each listing 302 and 304 includes a plurality of entries 306, each relating to a specific account within the financial institution 102. Each entry 306 includes an account number, a customer associated with the account number, and a balance of MBC. The customer may be identified by name, another identification (e.g., tax payer identification, social security number, etc.), or a combination thereof. The balance of MBC may express a positive number of MBC associated with the account (e.g., the number of MBC deposited by the customer) or an amount of MBC owed to the bank (e.g., as done in the listing of credit accounts 304). The account holders may have access to the balance information included in the overlay ledger 128 (e.g., via a website associated with the financial institution 102, a financial institution application running on a smartphone or tablet, in-person at a branch location of the financial institution, and/or through an ATM associated with the financial institution). Although the overlay ledger 128 associates amounts of MBC with individual accounts, the overlay ledger 128 does not associate specific private keys, public keys, and hashes with specific customer accounts. The amount of MBC listed in the overly ledger 128 is decoupled from the total amount of deposits and the total amount of credits within the financial institution 102. As indicated in FIG. 3, the amount of MBC listed in the overlay ledger 128 may be much less than the total amount of MBC on deposit at the financial institution. For example, the amount of MBC listed in the overlay ledger 128 may less than 15% of the total amount of MBC on deposit at the financial institution, less than 10% of the total amount of MBC on deposit at the financial institution, less than 5% of the total amount of MBC on deposit at the financial institution, or another percentage thereof.

The pooled account 126 comprises a database that stores the private keys, public keys, hash values, and amounts of MBC associated with each private key/public key/hash value group. The contents of the pooled account 126 remain secure and are not shared with individuals and entities outside of the financial institution 102. When the financial institution 102 receives MBC from a customer in a transaction, the information relating to the received MBC (i.e., the private key, the public key, the hash value, and an indication of the amount of MBC) is stored in the pooled account. When the financial institution 102 provides MBC to a customer in a transaction, the MBC is ultimately transferred based on the MBC information stored in the pooled account 126. After the transfer is complete, the overlay ledger 128 is updated to reflect the appropriate changes in account balances.

Information contained in the overlay ledger 128 and the pooled account 126 is routinely reconciled by the financial institution 102. The reconciliation of the information contained in the overlay ledger 128 and the pooled account 126 (as well as other assets of the financial institution 102) that the information contained within the overlay ledger 128 is up-to-date and accurate. The information is reconciled to ensure that the balance of assets (e.g., MBC) on hand is accurate, the balance of loans outstanding is accurate, and the amounts associated with individual accounts is accurate. The reconciliation processes may be carried out by the account balance processor 212 or by individuals. The reconciliation process may be performed on a repeating basis (e.g., on a daily basis, on an hourly basis, etc.). The MBC reconciliation process may be performed in conjunction with any reconciliation of other assets of the financial institution 102.

Figure 4:
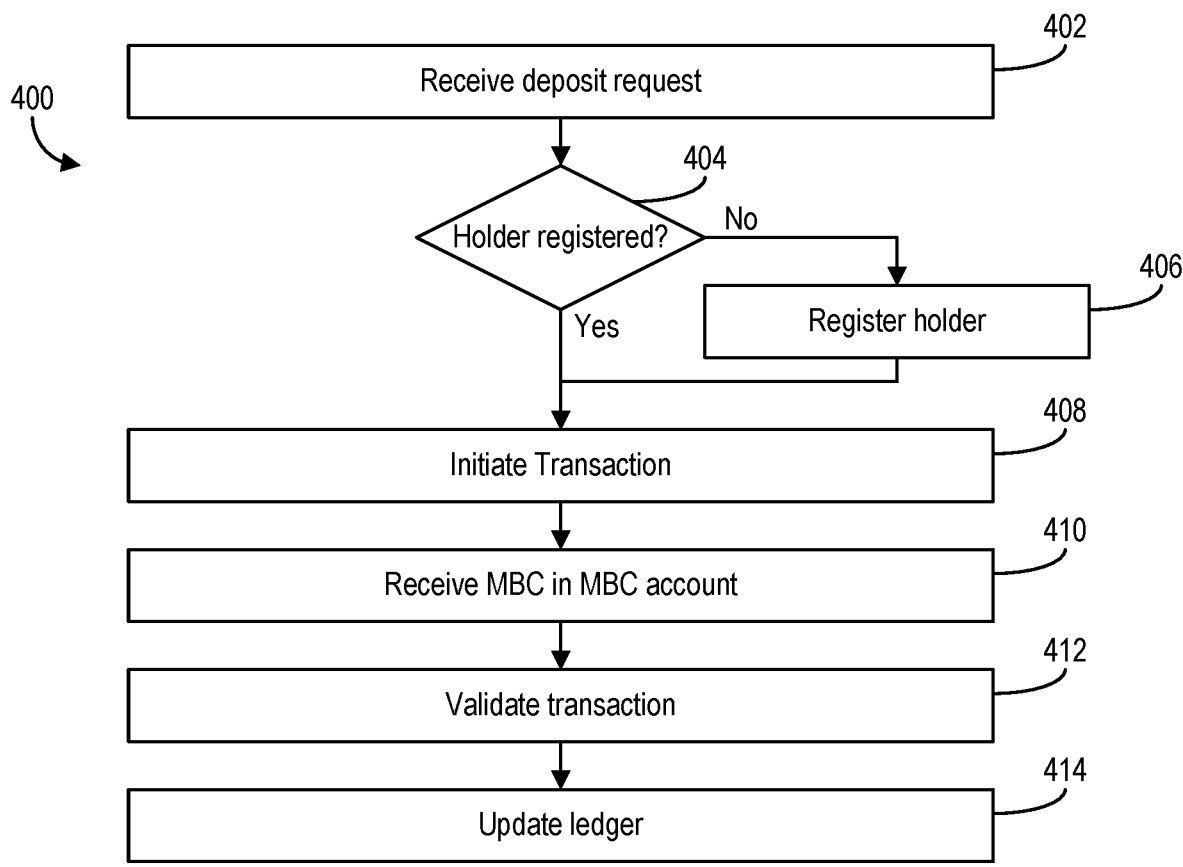
FIG. 4 is a flow diagram of a method of receiving MBC from a holder for deposit at a financial institution is shown according to an example embodiment.
Figure 5:
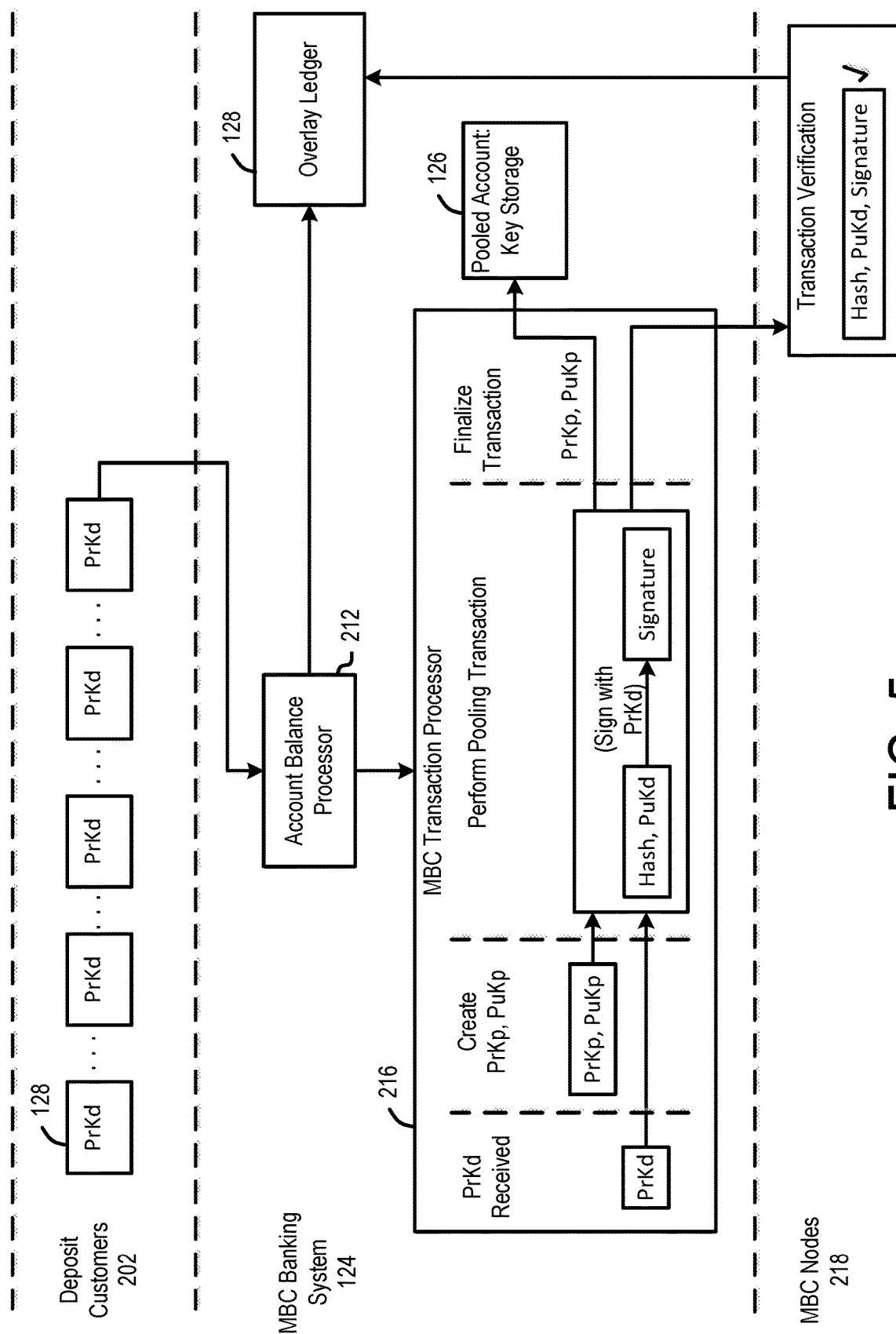
FIG. 5 is a flow diagram of how the deposit transaction of FIG. 4 is carried out by a financial institution according to an example embodiment.

Referring now to FIGS. 4 and 5, FIG. 4 shows a method 400 of receiving MBC from an account holder for deposit at a financial institution according to an example embodiment. FIG. 5 shows the interaction of structural components of FIG. 1 in accordance with the process steps of FIG. 4. In the example of FIG. 5, the customer makes a deposit by transferring various information for the MBC (including the private keys) to the financial institution 102. The financial institution 102 then executes an internal transfer of the MBC to a new private key/public key pair which are then stored in a database. As indicated above, other mechanisms may also be employed for receiving deposits.

Method 400 begins when a request to deposit MBC is received (402). The request (e.g., deposit request 208) is sent by a holder (e.g., deposit customer 202) of MBC to the financial institution. The request may include information relating to any of an identity of the holder, a type of the MBC to be deposited, an amount of the MBC, a public key associated with the MBC, a private key associated with the MBC (e.g., PrKd 502), and a desired destination for the MBC (e.g., an account within the financial institution associated with the holder within the financial institution). In some arrangements, the request is transmitted from a user device (e.g., a personal computer, a smartphone, customer computing system 108, etc.) and received by the account balance processor 212 of the MBC banking system 124 of the financial institution 106. In other arrangements, the request is initiated by an employee of the financial institution entering data into a computing system (e.g., an employee terminal connected to the server of the financial institution) during a person-to-person interaction. For example, the holder may walk into a branch location of the financial institution and initiate the deposit request via interaction with a teller at the branch.

After receiving the request, the financial institution determines if the requesting holder is registered with the financial institution (404). Generally, the holder is registered if the holder already has an MBC account with the financial institution. If the holder is not registered, the financial institution registers the holder (406). To register the holder, the financial institution requests information from the holder in order to open a MBC deposit account. The information may include information relating to the holder, such as name, date of birth, social security number, tax identification numbers, credit information, biometric information, and the like. The financial institution 102 knows the identities of its customers 104. The identity information may not be shared with the external MBC system (e.g., the MBC nodes 218 are unaware of the identities of the customers 104). After the holder provides the required information, the financial institution creates the necessary MBC accounts to continue with the deposit transaction.

If the holder is already registered or after the holder has been registered, the financial institution initiates a transaction of the MBC to be deposited from the holder to the financial institution (408). The transaction may be performed by a MBC transaction processor 216 within the MBC banking system 124. The MBC transaction processor 216 receives the private key PrKd for the deposit from the account balance processor. The MBC transaction processor 216 creates a new private key ("PrKp") and public key ("PuKp") for the transaction. The PrKp and PuKp will ultimately be stored in the pooled account 126. The private key PrKd provided from the customer is used by the MBC transaction processor 216 to sign a transaction request from the holder to the private key/public key pair PrKp/PuKp created by the MBC transaction processor 216. This creates a signature of the transaction, which is later used to verify the transaction. During the transaction, the account balance processor 212 may preliminarily update the overlay ledger 128 to indicate that the holder has deposited the designated amount of MBC into the associated account. The overlay ledger 128 may include an indication that the deposit transaction has not yet been verified. The indication may include information necessary to identify the unverified transaction in a later verification notification received from MBC nodes 218 (as described in further detail below with respect to 412 and 414).

In an alternative arrangement, instead of receiving a private key/public key pair as shown in FIG. 5, the deposit customer 202 initiates a transaction to an address (e.g., public key) associated with the financial institution. In this situation, the deposit customer 202 sends a request for an address to the financial institution (e.g., via the account balance processor 212). The MBC transaction processor 216 creates a new private key/public key pair and provides the public key to the deposit customer 202. The deposit customer 202 uses a MBC client (e.g., a MBC wallet application running on customer computing system 108) to initiate the transfer of MBC to the financial institution 102. After the transaction, the financial institution 102 stores the private key and public key pair in the pooled account 126.

After the transaction has been performed, the information relating to the transaction is stored in a pooled account (410). The MBC transaction processor 216 stores the PrKp, PuKp, hash value, and associated MBC balance in the pooled account 126. As discussed above, the pooled account 126 includes a database that stores the private keys, public keys, hash values, and amounts of MBC associated with each private key/public key/hash value group. The financial institution maintains the public keys, private keys, hash values, and amount of associated MBC of the pooled account 126 in secrecy to protect the deposited MBC from unauthorized transfers.

To validate the transaction (412), the MBC transaction processor 216 communicates MBC transaction information to MBC nodes 218, which use the transaction information to verify MBC transactions. The transactions are verified by operation of the MBC nodes 218. The MBC nodes 218 may verify MBC the transactions by verifying information relating to the transaction, such as determining that the signatures appear to be valid based on the public key and the hash used in the transaction. The verification information may be published in a chain of transactions (i.e., a blockchain) that is later used for further verifications. The MBC transaction processor 216 may determine the verification status of the individual transactions by accessing the chain of transactions from the MBC nodes 218. The verification information may be used to reconcile information contained in the overlay ledger 128 (e.g., during the above described reconciliation processes).

After the transaction is verified, the overlay ledger 128 is updated to reflect the deposited MBC (414). The overlay ledger 128 keeps track of the amount of MBC associated with each account holder with the financial institution. The overlay ledger 128 may be updated by the account balance processor 212 in response to receiving an indication from the MBC transaction processor 216 that the transaction has been verified by the MBC nodes 218. As previously indicated, there is no specific (one-to-one) correlation between the MBC held in the pooled account 126 and the MBC deposited by individual customers. Instead, the MBC received in the form of MBC deposits is pooled and the vast majority of the MBC is redeployed for other purposes, e.g., to make loans of MBC to other customers. As a result, the amount of MBC listed in the overlay ledger 128 may be much less than the total amount of MBC on deposit at the financial institution. After verification, the amount of deposited MBC may become available for use by the deposit customer 202 (i.e., the deposit customer 202 may perform a further transaction with the deposited MBC such as paying down a credit balance or withdrawing the deposited MBC).

Figure 6:
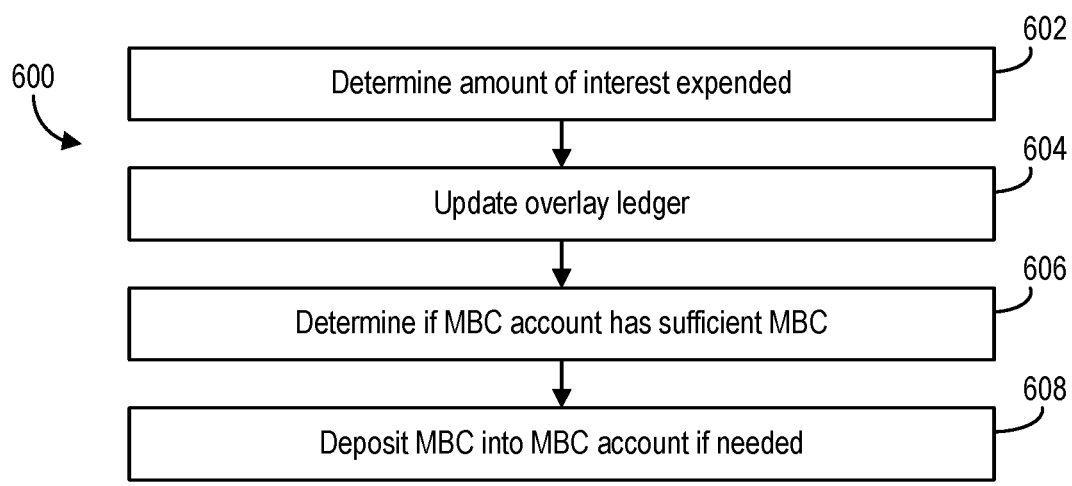
FIG. 6 is a flow diagram of a method of applying interest to a MBC deposit account is shown according to an example embodiment

Referring to FIG. 6, FIG. 6 shows a method 600 of applying interest to a MBC deposit account according to an example embodiment. As discussed above with respect to method 400, the above described financial institution systems are capable of securing MBC for the purposes of maintaining deposit accounts. One advantage of storing currency in a deposit account is the possibility of accruing interest on the stored MBC. Method 600 begins after a holder opened a MBC deposit account with a designated amount of MBC (e.g., as discussed above with respect to method 400). The financial institution determines an amount of interest expensed (i.e., the amount of interest earned by a deposit customer) on the MBC deposited in the account (602). The amount of interest expensed may be calculated by the account balance processor 212. The amount of interest expensed may depend on an amount of MBC stored in the account, a number of accounts associated with a given account holder, an exchange rate of MBC to a fiat currency, loan interest rates, general economic factors, and other factors.

The overlay ledger 128 maintaining MBC deposit account information is updated to reflect the calculated amount of interest earned (604). The overlay ledger 128 is updated by the account balance processor 212 to reflect the new balance of the account with the associated interest.

The financial institution determines whether the amount of MBC in the MBC account should be updated (606). In some situations, the accrual of interest triggers the purchase or transfer of additional MBC into the pooled account 126 (i.e., the amount of interest may trigger a capital call). In certain situations, the financial institution 102 is required to maintain a threshold level of MBC on hand and ready to be transferred. For example, the financial institution may be required to maintain a certain amount of capital on hand to meet any statutory capital requirements, leverage ratio requirements, and liquidity ratio requirements (e.g., the financial institution may be required to maintain between 5-10% of the total amount of MBC accounted for in the overlay ledger 128 in the pooled account 126). In other situations, the accrual of interest is merely updated on the ledger 128. If it is determined that the amount of MBC is not sufficient, the financial institution purchases or transfers additional MBC for deposit into the pooled account (608). As will be appreciated, in practice, the ratio of the amount of on-hand MBC to the amount of MBC deposits may be maintained on an aggregate basis as opposed to each time a transaction is conducted.

Figure 7:
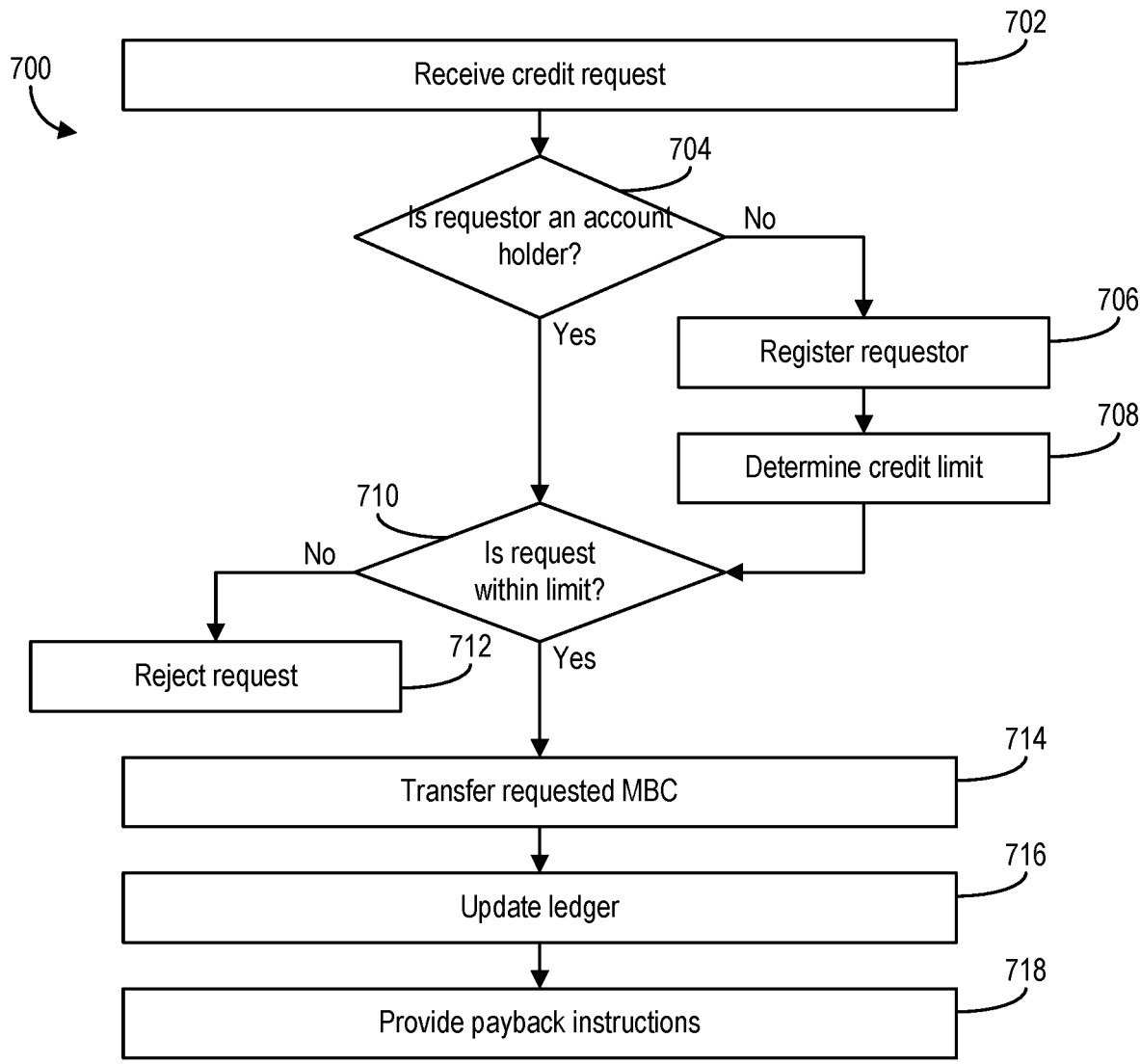
FIG. 7 is a flow diagram of a method of providing credit in MBC based on a credit request is shown according to an example embodiment.
Figure 8:
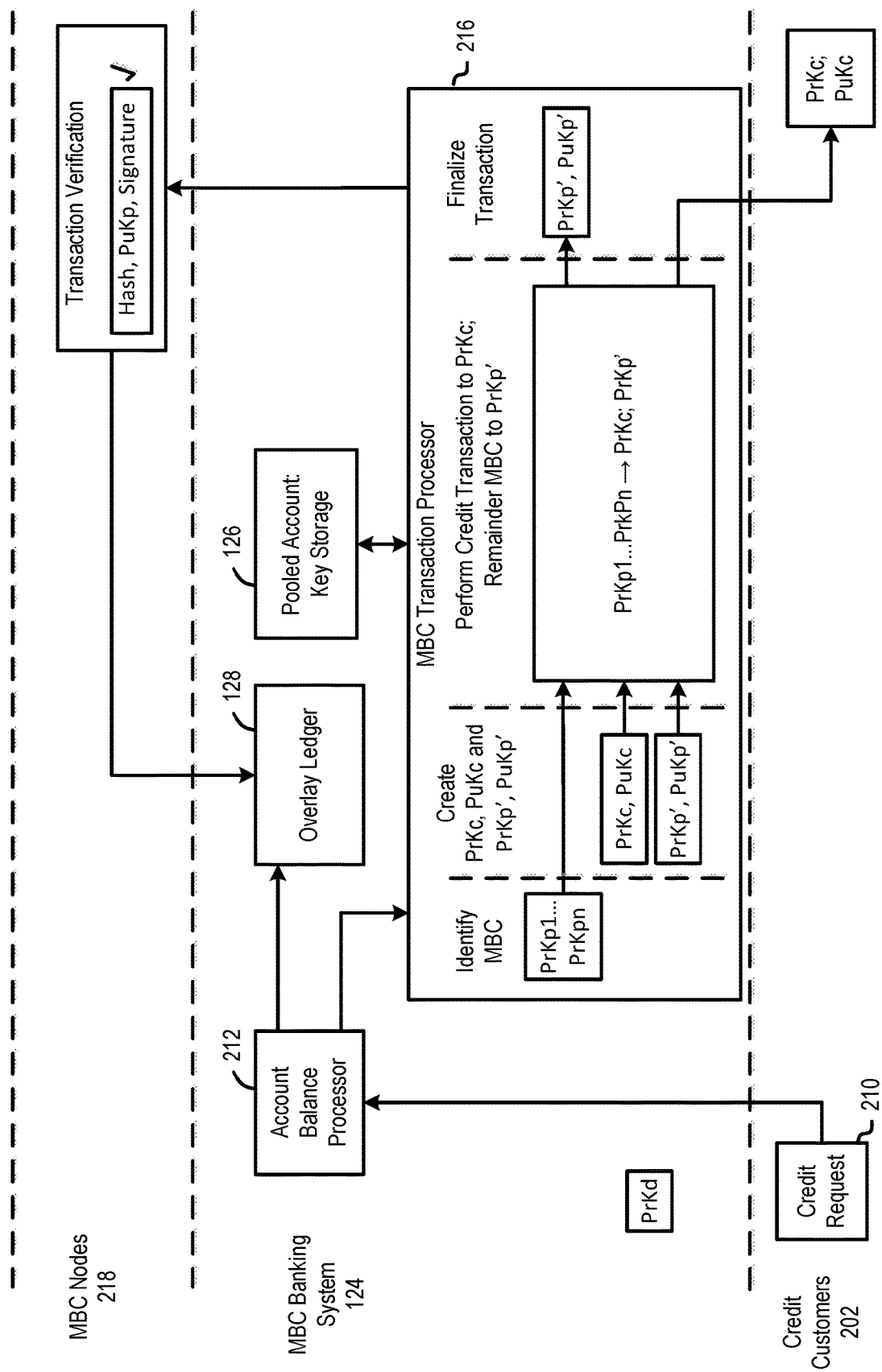
FIG. 8 is a flow diagram of how the credit transaction of FIG. 7 is carried out by a financial institution is shown according to an example embodiment.

Referring to FIGS. 7 and 8, FIG. 7 shows a method 700 of providing credit in MBC based on a credit request according to an example embodiment. FIG. 8 shows a flow diagram of how the credit transaction is carried out by the financial institution 102. FIG. 8 shows the interaction of structural components of FIG. 1 in accordance with the process steps of FIG. 7. As described in further detail below, the credit transaction for a credit customer 204 includes a transfer of funds from the financial institution to the credit customer 204. Method 700 begins when a credit request is received (702). The credit request 210 is initiated by a credit customer 204 and is received at an account balance processor 212 of the financial institution 102. The credit request 210 includes an amount of MBC requested and an identity of the credit customer 204. The request may also include an associated location (i.e. a public key associated with the credit customer 204) to which the MBC is to be transferred.

After receiving the request, the financial institution verifies the credit customer's identity (704). The credit request may be received in various forms. For example, the request may be received in the form of a transaction approval when a customer is at a point of sale. For example, a merchant point of sale device may request approval for a credit transaction in connection with an MBC-based credit card held by the customer. As another example, the customer may have an open line of credit with the financial institution. As yet another example, the credit request may be received in connection with a loan that may be secured by collateral (e.g., a home loan, a car loan, etc.).

If the credit customer does not have a credit account with the financial institution, the financial institution registers the customer with a new credit account (706). To register the credit requestor, the financial institution requests information from the holder in order to open a MBC credit account. The information includes information relating to the requestor, such as any of name, date of birth, social security number, tax identification numbers, credit report information, biometric information, and the like. The financial institution 102 knows the identities of its customers 104. The identity information may not be shared with the external MBC system (e.g., the MBC nodes 218 are unaware of the identities of the customers 104). If the customer has other existing accounts with the financial institution (e.g., a demand deposit account), the information associated with that account may be used to reduce the information requested from the customer. After the requestor provides the required information, the financial institution determines a credit limit (e.g., in the case of a credit card, open line of credit, etc.) or credit amount for the requestor (708). The credit limit indicates the maximum amount of MBC that the requestor can borrow from the financial institution. The credit limit is based at least in part on the received identity information.

If the credit customer 204 is already registered or after the credit customer 204 has been registered, the financial institution determines whether the credit request is within the amount of credit available (710). The account balance processor 212 cross references the overlay ledger 128 to determine if the credit request is within the amount of credit available to the credit customer 204. If the amount of request causes the requestor to exceed his credit limit, the request will be denied (712). For example, if a credit customer 204 has a credit limit of 200 MBC, and the request is for 250 MBC, the financial institution will deny the credit request. If the amount of the request is within the credit limit, the requested amount of MBC is transferred to the credit customer 204 (714). The details of the transfer from the financial institution 102 to the credit customer 204 are described with respect to FIG. 8.

Generally, during the transfer of MBC to the credit customer 204, the MBC transaction processor 216 performs a transfer from MBC stored in the pooled account 126 to a new address, and the new address is provided to the credit customer 204. At the start of the transfer, the MBC transaction processor 216 receives the credit request information from the account balance processor. Based on the information, the MBC transaction processor 216 identifies addresses (i.e., public and private key pairs) associated with MBC in the pooled account 126. As a general proposition, typically, there will not be a single address having the exact amount of MBC in the credit request 210. Accordingly, the MBC transaction processor 216 may identify a single address associated with more than the requested amount of MBC or a plurality of addresses (e.g., PrKp1+PrKpn) that total more than the requested amount of MBC. Then, the MBC transaction processor 216 may create two new addresses (i.e., two new private key and public key pairs). A first pair of keys (PrKc, PuKc) is created, which will ultimately be provided to the credit customer or provided to the recipient of the funds in the credit transaction (e.g., a merchant). A second pair of keys (PrKp', PuKp') receives the excess MBC (i.e., the remaining MBC change from the transaction) for return to the pooled account 126. The MBC transaction processor 216 initiates the transaction from the identified address or address from the pooled account 126 to the two new addresses in the appropriate amounts. The private and public key pair associated with the MBC change left over from the transaction (i.e., PrKp' and PuKp') is stored in the pooled account 126. The private and public key pair associated with the MBC of the credit request 210 (i.e., PrKc and PuKc) is provided to the customer 204 (e.g., transmitted to a customer computing device). The MBC transaction processor 216 broadcasts details relating to the transfer to the MBC nodes 218 for verification of the transaction (in the same manner as discussed above).

After the MBC is provided to the credit customer, the overlay ledger 128 is updated (716). The account balance processor 212 updates the overlay ledger 128 to associate the amount of MBC loaned to the credit customer 204 with the credit customer 204. The overlay ledger 126 may also be updated by the account balance processor 212 after the transfer is verified by the MBC nodes 218.

In an alternative arrangement, the recipient of the funds of the credit transaction may be the customer's deposit account within the financial institution. In such an arrangement, the credit transaction is achieved without a physical transfer of MBC by updating the overlay ledger 128. For example, the customer's credit account balance may be updated in the overlay ledger 128 to indicate that a certain amount of MBC credit has been issued by the financial institution, and the customer's deposit account balance may be updated in the overlay ledger 128 to indicate that the amount of MBC associated with the credit request is available in the deposit account.

Credit payback instructions are provided to the credit customer (718). In such an arrangement, the payments are received in a similar manner as discussed above with respect to receiving deposits of MBC (e.g., in a similar manner as method 400 as discussed above with respect to FIGS. 4 and 5). In such an arrangement, however, instead of a deposit request, the credit customer provides a payment request with an identity of the credit customer, an amount of MBC to be paid (i.e., an amount to pay down the balance of the customer's credit account), and a credit account number. In other arrangements, the requestor has a MBC deposit account with the financial institution. In this arrangement, the customer can repay the loan by transferring MBC from the deposit account back to the financial institution. This may be achieved without a physical transfer of additional MBC by updating the overlay ledger 126.

Figure 9:
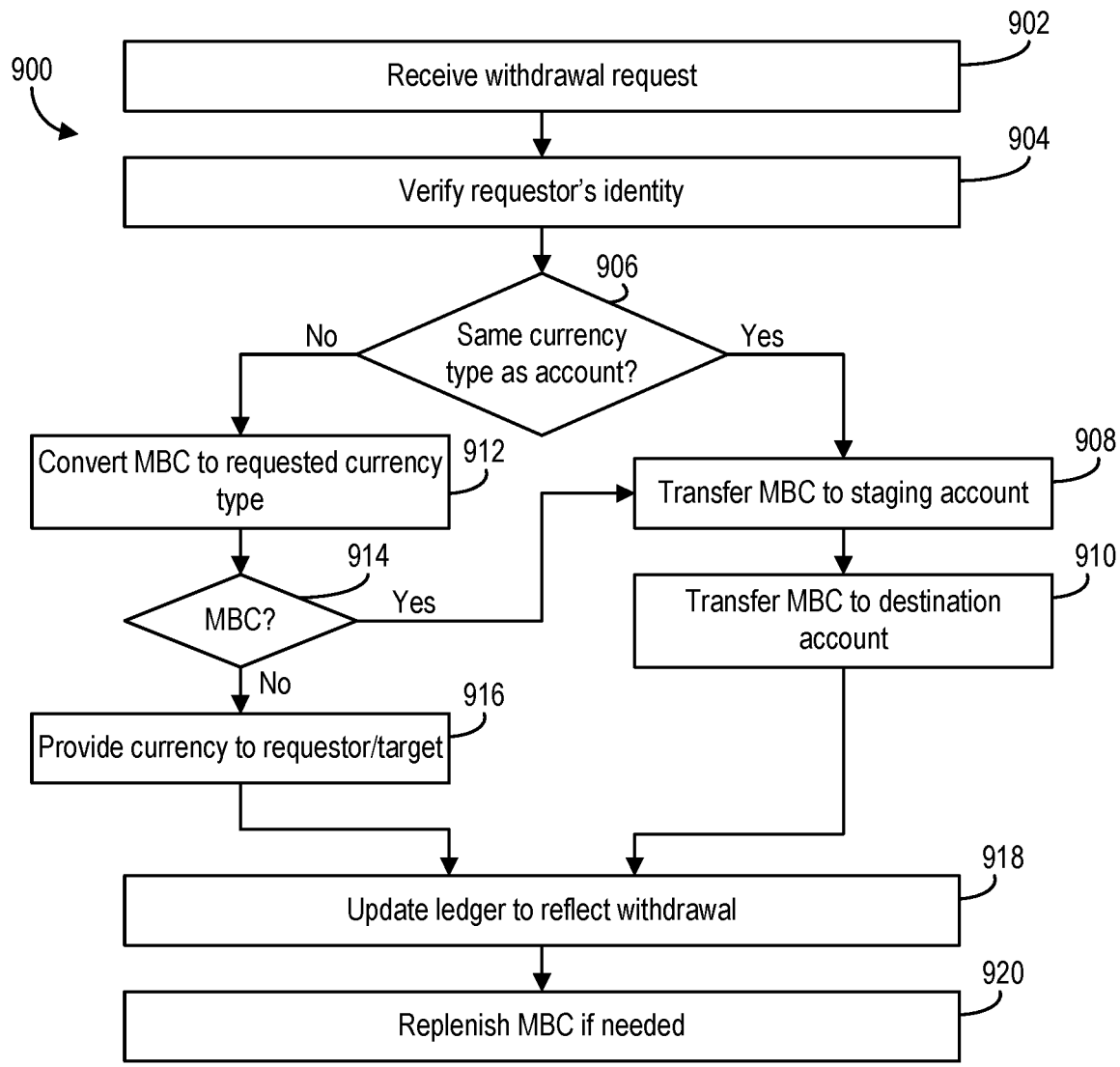
FIG. 9 is a flow diagram of a method of performing a withdrawal transaction from a MBC account with a financial institution is shown according to an example embodiment.
Figure 10:
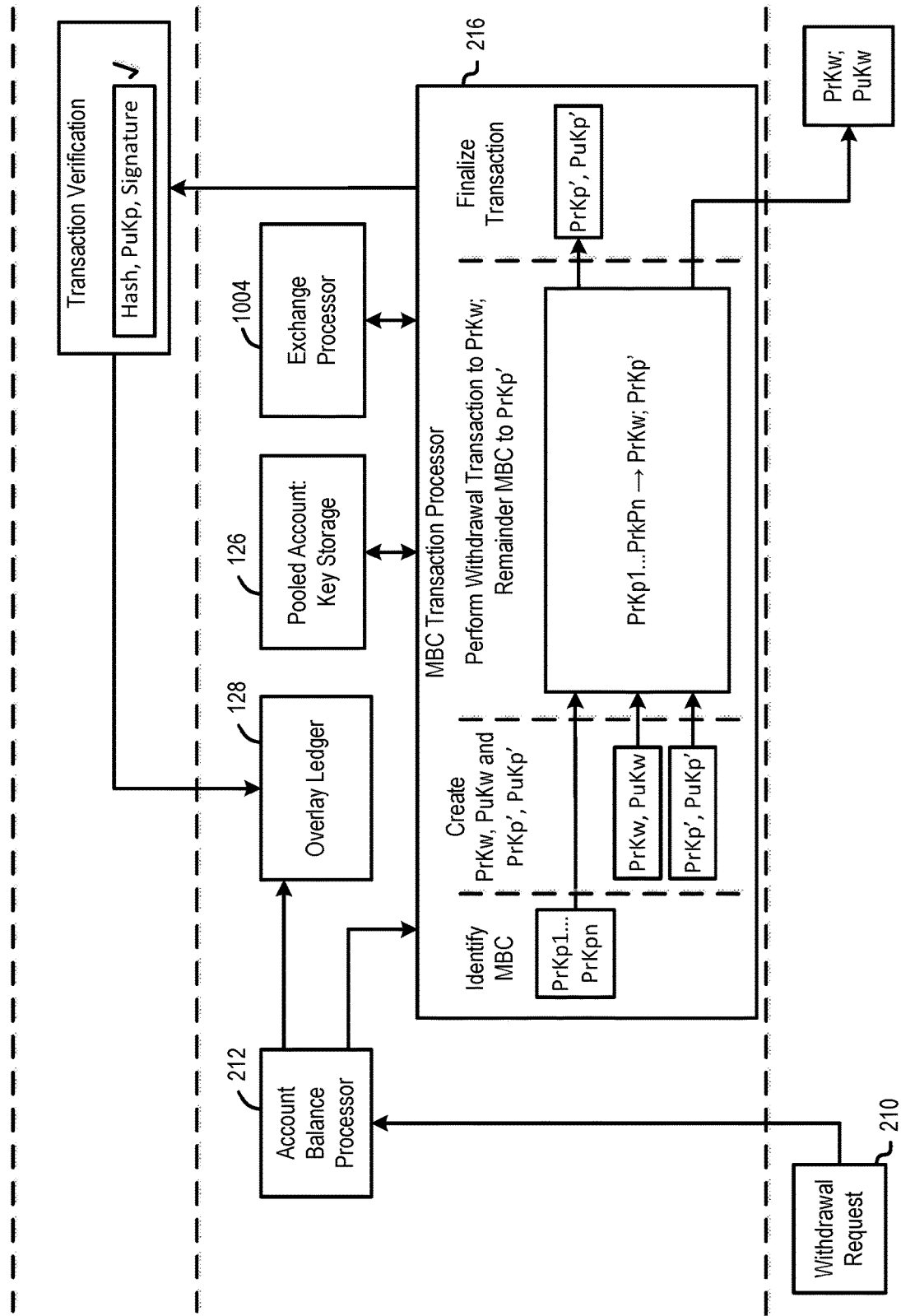
FIG. 10 is a flow diagram of how the withdrawal transaction of FIG. 9 is carried out by a financial institution is shown according to an example embodiment.

Referring to FIG. 9, a method 900 of performing a withdrawal transaction out of a MBC account with a financial institution is shown according to an example embodiment. Referring to FIG. 10, a flow diagram of how the withdrawal transaction is carried out by the financial institution 102 is shown. FIG. 10 shows the interaction of structural components of FIG. 1 in accordance with the process steps of FIG. 9. As described in further detail below, the withdrawal transaction for a deposit customer 202 is similar to the above described credit transaction (as discussed above with respect to method 700). Unlike the credit transaction, the withdrawal transaction includes a withdrawal against a MBC deposit account instead of a loan against a MBC credit account. The withdrawal out of the MBC account may be effectuated in MBC or fiat currency.

The withdrawal transaction begins when a withdrawal request is received (902). The withdrawal request 1002 is initiated from a MBC account holder and is received by an account balance processor 212 of the financial institution 102. The request may include any of an identity of the deposit customer 202, an amount of MBC to withdraw, an identity of the MBC account containing the MBC, an output currency type, a destination for withdrawn funds (e.g., an account or address associated with the a recipient of the funds such as another financial institution or a third party, etc.), or a combination thereof. In some arrangements, the request is transmitted from a user device (e.g., a personal computer, a smartphone, etc.) and received by the account balance processor 212. In other arrangements, the request is initiated by an employee of the financial institution entering data into a computing system (e.g., an employee terminal connected to the server of the financial institution) during a person-to-person interaction. For example, the holder may walk into a branch location of the financial institution and initiate the withdrawal request via interaction with a teller at the branch. In further arrangements, the request is initiated through an ATM.

After the request is received, the deposit customer's identity is verified (904). The financial institution 102 verifies the identity of the deposit customer 202 as the account holder associated with the MBC account in the request or as an authorized user. The deposit customer 202 may provide information (e.g., a PIN, a password, a biometric, an answer to a security question, etc.) to the financial institution 102. The financial institution 102 uses the provided information to verify the identity by comparing the provided information with previously verified information stored in a computing system of the financial institution.

After the identity of the deposit customer is verified as an account holder, the type of currency requested out of the MBC account is compared to the type of currency in the MBC account (906). The deposit customer 202 associated with the MBC account may withdraw funds from the account in a currency other than the MBC. For example, although the MBC account maintains a balance of MBC, the deposit customer 202 may withdraw fiat currency from the MBC account (e.g., via an ATM). As another example, although the MBC account maintains a balance of a first type of MBC (e.g., Bitcoin), the account holder may choose to transfer funds to another party in a second type of MBC (e.g., Dogecoin). The MBC transaction processor 216 compares the requested currency type with the currency type of the MBC account.

If the desired currency of the withdrawal request is the same MBC type that is in the MBC account, the requested amount of MBC is transferred from the financial institution to the deposit customer (908). The transfer occurs in the same manner as discussed above with respect to method 700 (e.g., in the same manner as described above with respect to 714). The withdrawn MBC is provided to the deposit customer in the form of a public key and private key pair (PuKw and PrKw). If the desired currency of the withdrawal request is not in the same currency as the MBC account, the currency in the MBC account is exchanged for the desired currency type (910). An exchange processor 1004 within the MBC banking system 124 determines the appropriate amount of MBC to withdraw from the account to provide the requested amount of the desired currency type. The currency may be exchanged internally within the financial institution or externally through a third-party MBC exchange market. The exchange may facilitate the exchange of a first type of MBC for a second type of MBC, the exchange of MBC to fiat currency, or the exchange of fiat currency to MBC. In other situations, currency is not actually exchanged, but the transfer is effectuated through updating of the overlay ledger 128 (e.g., if the financial institution maintains accounts in multiple types of MBC). As noted above, in some situations, the MBC within the account is exchanged to a second type of MBC. The MBC transaction processor determines whether the exchanged to currency is a second type of MBC (912). If the MBC is exchanged to a second type of MBC, the second type of MBC is then transferred to its destination address in the same manner as discussed above with respect to 908. If the MBC is exchanged into a traditional fiat currency, the currency is provided to the deposit customer 202 or to the recipient of the withdrawal (914). For example, if the requestor requests a withdrawal from a MBC account in U.S. Dollars at an ATM, the ATM would dispense the requested amount of U.S. dollars to the requestor.

In either of the above described situations (fiat currency withdrawal or MBC withdrawal), the overlay ledger is updated to reflect the withdrawal (916). The account balance processor 212 updates the overlay ledger 128 to associate the amount of MBC withdrawn to the deposit customer 202 account within the overlay ledger 126. The overlay ledger 126 may also be updated by the MBC nodes 218 or the account balance processor 212 after the transfer is verified by the MBC nodes 218.

If necessary, the financial institution replenishes MBC into the pooled account 126 MBC (918). As discussed above, in certain situations, the financial institution 102 is required to maintain a threshold level of MBC on hand and ready to be transferred. For example, the financial institution 102 may be required to maintain a certain amount of capital on hand to meet any statutory capital requirements, leverage ratio requirements, and liquidity ratio requirements (e.g., the financial institution may be required to maintain between 5-10% of the total amount of MBC accounted for in the overlay ledger 128 in the pooled account 126). If it is determined that the amount of MBC is not sufficient due to the withdrawal, the financial institution 102 purchases or transfers additional MBC for deposit into the pooled account 126.

Figure 11:
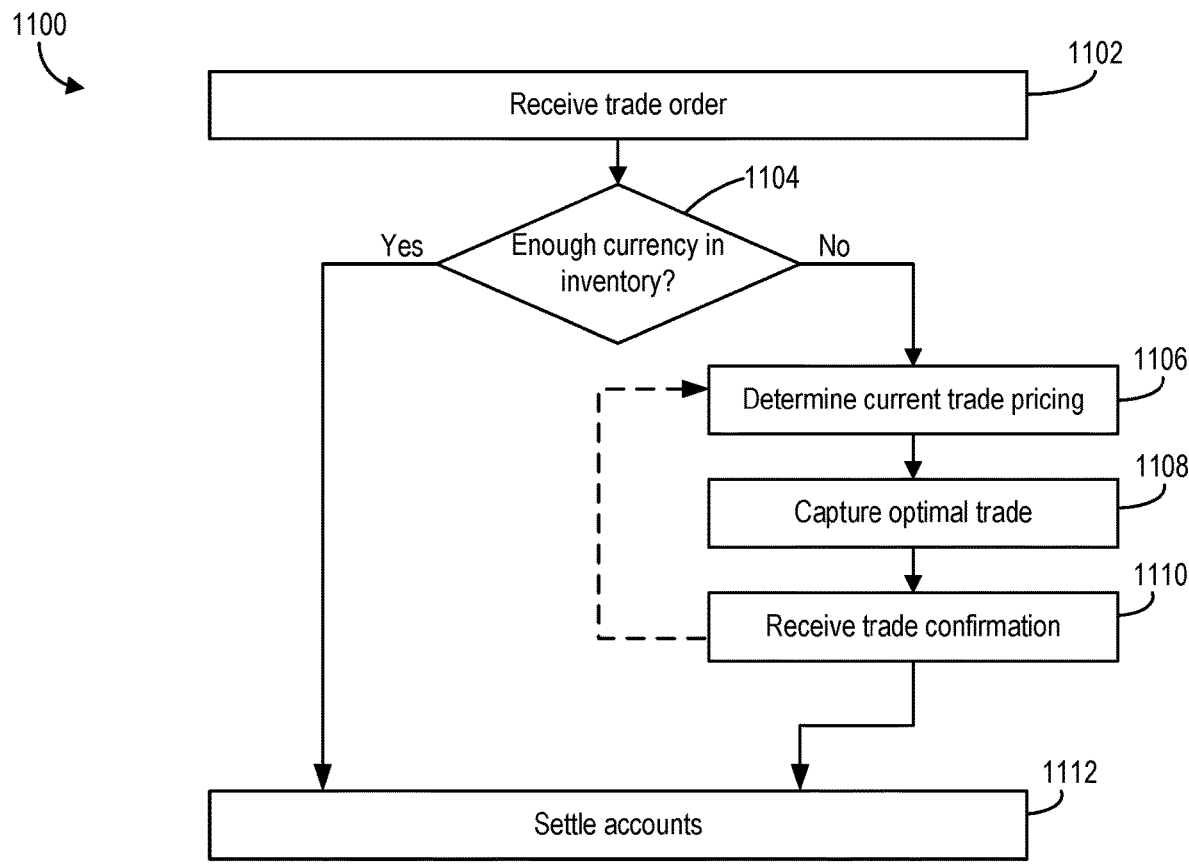
FIG. 11 is a flow diagram of a method of performing a currency trade involving MBC according to an exemplary embodiment.

Referring to FIG. 11, a flow diagram of a method 1100 of performing a currency trade (i.e., a currency exchange) involving MBC is shown according to an exemplary embodiment. Method 1100 may be performed as a result of a customer request or as a result of an internal decision made by an employee of the financial institution 102. Method 1100 begins when a trade order is received (1102). The trade order is received at a processor of the financial institution computing system 106 (e.g., at the MBC transaction processor 216). The trade order may be received from the customer computing system 108. The trade order indicates a request from the customer to trade a certain amount of a first currency into a second currency. For example, the trade order may indicate that the customer is ordering the exchange of 1 Bitcoin to US Dollars. The trade order indicates at least one originating customer account (e.g., the account with the currency to be exchanged) and at least one destination customer account (e.g., the account that will receive currency from the trade). In some arrangements, the trade order also includes information relating to a target exchange rate (e.g., a maximum or minimum exchange rate, a target exchange rate, etc.). In some arrangements, the trade order also includes acceptance of terms and conditions of the exchange that are set by the financial institution 102. The terms and conditions of the exchange may include an indication of a fee (e.g., a flat fee, a percentage of the exchanged amount, etc.) collected by the financial institution 102 for performing the currency trade.

The financial institution 102 determines if there is enough currency in inventory to perform the trade without acquiring trade on the market (1104). The financial institution 102 may keep stores of different types of currency. In some jurisdictions, the financial institution 102 may be required by law to maintain a certain amount of currency in reserves (e.g., a required cash reserve ratio, a required liquidity percentage, etc.). Accordingly, the financial institution 102 may have enough of the target, second currency on hand to perform the trade at a market exchange rate without going to the market to acquire the second currency. If there is enough currency in inventory, method 1100 skips to 1112 (as described in further detail below), and updates the appropriate account balances to indicate that the trade has been executed. The market exchange rate may be determined by averaging advertised exchange rates of partner financial institutions or currency exchanges.

If there is not enough currency in inventory, the current trade pricing for various currencies is determined (1106). The financial institution 102 determines the current exchange rates for a plurality of different currency transactions, including the exchange rate for the first currency to the second currency. In executing the desired trade, the financial institution 102 may execute a plurality of trades involving a plurality of currencies to maximize the profit earned by the desired trade. For example, if the trade order is for converting Bitcoin to US Dollars, the financial institution 102 may execute two different trades: a first trade exchanging Bitcoin for another currency (e.g., Euros) that presents the most favorable exchange rate out of Bitcoin, and a second trade exchanging the other currency (e.g., Euros received in the first trade) or a third currency owned by the financial institution (e.g., Australian Dollars) into US Dollars, whichever presents the most favorable exchange rate into US Dollars. The financial institution 102 selects the exchange rates that offer the margins for the financial institution 102. Alternatively, the financial institution 102 may execute a single trade directly from the first currency to the second currency if the exchange rate is favorable. Thus, the exchange rates for multiple different currencies, including at least the first currency and the second currency, are determined. The processor of the financial institution computing system 106 may poll various markets and trading partners to gather the exchange rates.

Based on the exchange rates, the optimal trade is captured (1108). The processor of the financial institution computing system 106 determines the optimal trade. As discussed above, the optimal trade may involve more than one trade. For example, the initial trade order indicates that the customer would like to trade Bitcoin for US Dollars. Based on the exchange rates determined at 1106, the exchange rate may be determined to be $400 US for every 1 Bitcoin. This is the price charged to the customer (plus any additional fees charged by the financial institution 102). However, the financial institution 102 may determine that it is optimal to make two trades: a first trade of the 1 Bitcoin to $450 AU and a second trade of 318 EUR (from the reserves of the financial institution 102) to the $400 US to satisfy the trade. The processor of the financial institution computing system 106 captures the optimal trade or trades and transmits a trade request with the identified trading partners in the identified currency markets. The financial institution computing system 106 may communicate with computing systems of the identified trading partners (e.g., computing systems of other financial institutions, computing systems of currency brokerages, etc.).

A trade confirmation is received (1110). The financial institution computing system 106 receives a trade confirmation, or trade confirmations in the event of a multi-trade situation. The trade confirmation is received from a computing system associated with the trade partner or a financial exchange. The trade confirmation may be accompanied by a transfer of currency from the trading partner to the financial institution 102.

Once the trade confirmation is received, the accounts involved in the currency trade are settled (1112). The financial institution computing system 106 updates the various databases storing account information for the accounts involved in the currency trade. There are three basic types of trades that can be made involving MBC: (1) fiat currency to MBC, (2) MBC to fiat currency, and (3) MBC to MBC. Each settlement procedure is described in further detail below. If the trade is for fiat currency (e.g., US Dollars) to MBC (e.g., Bitcoin), the customer's fiat currency and MBC account balances are updated by the processor of the financial institution computing system 106. The customer's fiat currency account balance in the fiat banking system 122 is credited with the additional balance. The overlay ledger 128 associated with the MBC banking system 124 is debited to reflect the trade. If the trade is for MBC (e.g., Bitcoin) to fiat currency (e.g., US Dollars), the customer's fiat currency and MBC account balances are updated by the processor of the financial institution computing system 106. The customer's fiat currency account balance in the fiat banking system 122 is debited to reflect the trade. The overlay ledger 128 associated with the MBC banking system 124 is credited to reflect the trade. If the trade is for a first type of MBC (e.g., Bitcoin) to a second type of MBC (e.g., Litecoin), the processor of the financial institution computing system 106 updates the balances of the customer's MBC accounts. In this situation, the customer has multiple MBC accounts, each of the MBC accounts is associated with an individual overlay ledger (e.g., overlay ledger 128). Accordingly, the processor of the financial institution computing system updates each overlay ledger to reflect the balance changes. In each of the above situations, the processor of the financial institution computing system also updates the pooled MBC account 126 of the MBC banking system 124 to reflect updated key pair information associated with the various MBCs maintained in the pooled MBC account.

As described above, the financial institution 102 allows MBC customers of the financial to utilize advantages of banking services such as the accrual of interest on MBC (e.g., as discussed above with respect to method 600), credit services in MBC (e.g., as discussed above with respect to method 700), the use of bank ATMs (e.g., as discussed above with method 900), and the like. Additionally, the above described financial institution 102 may provide insurance on MBC deposit accounts. The insurance may be provided up to a certain limit of MBC (i.e., a certain quantity of MBC or a certain equivalent value of MBC in a designated fiat currency). The insurance may be provided by the government (e.g., via the FDIC), by the financial institution 102, or by a private insurer.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions of the invention might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention as defined in the appended claims. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention as expressed in the appended claims.

What is claimed is:

1. A method of performing an electronic trade involving a math-based currency ("MBC") for a customer having a MBC account with an institution, the method comprising:
    receiving, at an MBC transaction processor, a trade order from the customer via a customer computing device, the trade order including a trade request from the customer from a first amount of a first currency for a second amount of a second currency, wherein one of the first currency and the second currency is the MBC, wherein the MBC account of the customer comprises an account balance entry in an overlay ledger associated with a pooled MBC account comprising a plurality of public and private key pairs corresponding to a respective plurality of MBC amounts, wherein the MBC stored in the pooled MBC account is not associated with any particular customer;
    determining, by an exchange processor, current exchange rates for a plurality of different currency transactions including an exchange rate for the first currency to the second currency, an exchange rate for the first currency to a third currency, and an exchange rate for the third currency to the second currency;
    determining, by the exchange processor, an optimal trade sequence by at least:
        calculating, by the exchange processor, a first value of the second currency when executing a trade from the first currency to the second currency;
        calculating, by the exchange processor, a second value of the second currency when executing a trade from the first currency to the third currency and then the third currency to the second currency; and
        determining, by the exchange processor, a higher value based on comparing the first value of the second currency to the second value of the second currency;
    when the first currency is the MBC:
        generating, by the MBC transaction processor, a first new private key and public key pair for the transaction, wherein the first private key and public key pair are associated with a first address in a pooled MBC account database;
        generating, by the MBC transaction processor, a second new private key and public key pair with any excess MBC returning to the pooled MBC account for the transaction, wherein the second private key and public key pair are associated with a second address in the pooled MBC account database; and
        transmitting, by the MBC transaction processor, a currency trade request to a computing system associated with a trading partner using the optimal trade sequence comprising the generated new public and private key pair;
    when the second currency is the MBC:
        generating, by the MBC transaction processor, a new private key and public key pair for the transaction, wherein the new private key and public key pair are associated with a new address in the pooled MBC account database;
        transmitting, by the MBC transaction processor, a generated public key of the new public and private key pair to the trading partner; and
        receiving, by the MBC transaction processor, a trade confirmation from the computing system associated with the trading partner;
    updating, by an account balance processor, the account balance entry on the overlay ledger based on the currency trade, wherein the overlay ledger includes information relating to account balances of a plurality of MBC accounts associated with a plurality of customers;
    updating, by the MBC transaction processor, the pooled MBC account including updating public key and private key pair information associated with the MBC held by the institution and generated consequent to the trade order;
    updating, by the MBC transaction processor, the pooled MBC account including updating MBC balance information associated with the MBC held by the institution;
    broadcasting, by the MBC transaction processor, the currency trade to a plurality of MBC verification nodes; and
    in response to the MBC verification nodes verifying the currency trade, updating, by the MBC transaction processor, a blockchain associated with the currency trade.

2. The method of claim 1, further comprising collecting a fee for performing the currency trade.

3. The method of claim 2, wherein the fee is one of (1) a flat fee or (2) a percentage of the first amount of the first currency.

4. The method of claim 1, wherein the first currency is a first type of MBC and the second currency is a second type of MBC.

5. The method of claim 4, wherein the overlay ledger is a first overlay ledger associated with the first type of MBC, and wherein the method further comprises updating a second overlay ledger associated with the second type of MBC.

6. The method of claim 1, wherein the optimal trade sequence includes two currency trades.

7. The method of claim 6, wherein a first trade of the two currency trades involves trading the first currency for the third currency, and wherein a second trade of the two currency trades involves trading a fourth currency held by the institution for the second currency.

8. The method of claim 6, wherein the optimal trade sequence including the two currency trades generates a higher profit than directly trading the first currency for the second currency.

9. A system for opening and maintaining deposit accounts of math-based currency ("MBC"), the system comprising:
    a network interface;

an overlay ledger including information relating to a plurality of MBC accounts associated with a plurality of customers;
a pooled MBC account comprising a database of private key and public key pairs corresponding to various amounts of MBC held by the system, wherein the MBC stored in the pooled MBC account is not associated with any particular customer; and
a plurality of processors executing operations from at least one memory comprising:
receiving, by an MBC transaction processor of the plurality of processors, a trade order from the customer via a customer computing device, the trade order including a trade request from the customer from a first amount of a first currency for a second amount of a second currency, wherein one of the first currency and the second currency is the MBC, wherein the MBC account of the customer comprises an account balance entry in an overlay ledger associated with the pooled MBC account;
determining, by an exchange processor of the plurality of processors, current exchange rates for a plurality of different currency transactions including an exchange rate for the first currency to the second currency, an exchange rate for the first currency to a third currency, and an exchange rate for the third currency to the second currency;
determining, by the exchange processor, an optimal trade sequence by:
calculating, by the exchange processor, a first value of the second currency when executing a trade from the first currency to the second currency;
calculating, by the exchange processor, a second value of the second currency when executing a trade from the first currency to the third currency and then the third currency to the second currency; and
determining, by the exchange processor, a higher value based on comparing the first value of the second currency to the second value of the second currency;
when the first currency is the MBC:
generating, by the MBC transaction processor, a first new private key and public key pair for the transaction, wherein the first private key and public key pair are associated with a first address in a pooled MBC account database;
generating, by the MBC transaction processor, a second new private key and public key pair with any excess MBC returning to the pooled MBC account for the transaction, wherein the second private key and public key pair are associated with a second address in the pooled MBC account database; and
transmitting, by the MBC transaction processor, a currency trade request to a computing system associated with a trading partner using the optimal trade sequence comprising the generated new public and private key pair, and;
when the second currency is the MBC:
generating, by the MBC transaction processor, a new private key and public key pair for the transaction, wherein the new private key and public key pair are associated with a new address in the pooled MBC account database;
transmitting, by the MBC transaction processor, a generated public key of the new public and private key pair to the trading partner; and receiving, by the MBC transaction processor, a trade confirmation from the computing system associated with the trading partner;
updating, by an account balance processor of the plurality of processors, the account balance entry on the overlay ledger based on the currency trade;
updating, by the MBC transaction processor, the database of private key and public key pairs including updating public key and private key pair information associated with the MBC held by the system and generated consequent to the trade order; and
updating, by the MBC transaction processor, the pooled MBC account including updating MBC balance information associated with the MBC held by the system;
broadcasting, by the MBC transaction processor, the currency trade to a plurality of MBC verification nodes; and
in response to the MBC verification nodes verifying the currency trade, updating, by the MBC transaction processor, a blockchain associated with the currency trade.

10. The system of claim 9, the operations further comprises collecting a fee for performing the trade.

11. The system of claim 10, wherein the fee one of (1) a flat fee or (2) a percentage of the first amount of the first currency.

12. The system of claim 9, wherein the first currency is a first type of MBC and the second currency is a second type of MBC.

13. The system of claim 12, wherein the overlay ledger is a first overlay ledger associated with the first type of MBC, and wherein the operations further comprise updating a second overlay ledger associated with the second type of MBC.

14. The system of claim 9, wherein the optimal trade sequence includes two currency trades.

15. The system of claim 14, wherein a first trade of the two currency trades involves trading the first currency for the third currency, and wherein a second trade of the two currency trades involves trading a fourth currency held by the system for the second currency.

16. The system of claim 14, wherein the optimal trade sequence including the two currency trades generates a higher profit than directly trading the first currency for the second currency.

17. A non-transitory computer-readable media having stored therein a set of instructions that, when executed by a plurality of processors, cause the plurality of processors to implement an electronic process of trading currency types for an institution, the process comprising:
receiving, by an MBC transaction processor of the plurality of processors, a trade order from a customer via a customer computing device, the trade order including a trade request from the customer from a first amount of a first currency for a second amount of a second currency, wherein one of the first currency and the second currency is a math-based currency ("MBC"), wherein a MBC account of the customer comprises an account balance entry in an overlay ledger associated with a pooled MBC account comprising a plurality of public and private key pairs corresponding to a respective plurality of MBC amounts, wherein the MBC stored in the pooled MBC account is not associated with any particular customer;
determining, by an exchange processor of the plurality of processors, current exchange rates for a plurality of different currency transactions including an exchange rate for the first currency to the second currency, an exchange rate for the first currency to a third currency, and an exchange rate for the third currency to the second currency;

determining, by the exchange processor, an optimal trade sequence by at least:
  calculating, by the exchange processor, a first value of the second currency when executing a trade from the first currency to the second currency;
  calculating, by the exchange processor, a second value of the second currency when executing a trade from the first currency to the third currency and then the third currency to the second currency; and
  determining, by the exchange processor, a higher value based on comparing the first value of the second currency to the second value of the second currency;

when the first currency is the MBC:
  generating, by the MBC transaction processor, a first new private key and public key pair for the transaction, wherein the first private key and public key pair are associated with a first address in a pooled MBC account database;
  generating, by the MBC transaction processor, a second new private key and public key pair with any excess MBC returning to the pooled MBC account for the transaction, wherein the second private key and public key pair are associated with a second address in a pooled MBC account database; and
  transmitting, by the MBC transaction processor, a currency trade request to a computing system associated with a trading partner using the optimal trade sequence comprising the generated new public and private key pair;

when the second currency is the MBC:
  generating, by the MBC transaction processor, a new private key and public key pair for the transaction, wherein the new private key and public key pair are associated with a new address in a pooled MBC account database;
  transmitting, by the MBC transaction processor, a generated public key of the new public and private key pair to the trading partner; and
  receiving, by the MBC transaction processor, a trade confirmation from the computing system associated with the trading partner;

updating, by an account balance processor of the plurality of processors, the account balance entry on the overlay ledger based on the currency trade, wherein the overlay ledger includes information relating to account balances of a plurality of MBC accounts associated with a plurality of customers;

updating, by the MBC transaction processor, the pooled MBC account including updating public key and private key pair information associated with the MBC held by the institution and generated consequent to the trade order; and updating, by the MBC transaction processor, the pooled MBC account including updating MBC balance information associated with the MBC held by the institution broadcasting, by the MBC transaction processor, the currency trade to a plurality of MBC verification nodes;

in response to the MBC verification nodes verifying the currency trade, updating, by the MBC transaction processor, a blockchain associated with the currency trade.

* * * * *